United States Patent [19]
Keller et al.

[11] Patent Number: 5,770,325
[45] Date of Patent: Jun. 23, 1998

[54] UV CURABLE INK FOR GAME BALL AND METHOD OF PRINTING

[75] Inventors: Viktor Keller, Colchester, Conn.; Thomas J. Kennedy, Wilbraham, Mass.

[73] Assignee: Lisco, Inc., Tampa, Fla.

[21] Appl. No.: 529,361

[22] Filed: Sep. 18, 1995

[51] Int. Cl.[6] .................................................... B41M 3/12
[52] U.S. Cl. ........................................... 428/914; 473/351
[58] Field of Search .................... 428/914; 273/183.1, 273/187.3, 181 A, 32 R–32 H; 473/351

[56] References Cited

U.S. PATENT DOCUMENTS

| | | | |
|---|---|---|---|
| 1,814,170 | 7/1931 | Long | 197/6.2 |
| 1,814,312 | 7/1931 | Heene | 197/6.4 |
| 1,921,571 | 8/1933 | Jones | 197/6.2 |
| 2,539,303 | 1/1951 | Gerke et al. | 197/6.2 |
| 3,781,214 | 12/1973 | Nemoto et al. | 260/22 |
| 3,803,109 | 4/1974 | Nemoto et al. | 260/89.1 |
| 3,804,735 | 4/1974 | Radlove et al. | 204/159.23 |
| 3,847,770 | 11/1974 | Radlowe et al. | 204/159.23 |
| 3,856,744 | 12/1974 | Radlove et al. | 260/40 R |
| 4,086,851 | 5/1978 | Brandell | 101/4 |
| 4,128,536 | 12/1978 | Brodsky et al. | 427/54 |
| 4,164,423 | 8/1979 | Schumacher et al. | 106/20 |
| 4,178,186 | 12/1979 | Yasui et al. | 106/20 |
| 4,200,667 | 4/1980 | Lee et al. | 427/44 |
| 4,251,341 | 2/1981 | Felder et al. | 204/159.24 |
| 4,271,258 | 6/1981 | Watariguchi | 430/284 |
| 4,374,670 | 2/1983 | Slocombe | 106/20 |
| 4,419,196 | 12/1983 | Beckerick et al. | 204/157.1 R |
| 4,508,570 | 4/1985 | Fujii et al. | 106/20 |
| 4,680,368 | 7/1987 | Nakamoto et al. | 528/49 |
| 4,864,324 | 9/1989 | Shirota et al. | 346/1.1 |
| 4,875,410 | 10/1989 | Lee et al. | 101/170 |
| 5,085,697 | 2/1992 | Kimura et al. | 106/20 |
| 5,088,737 | 2/1992 | Frank et al. | 273/138 A |
| 5,160,536 | 11/1992 | Harris et al. | 106/19 R |
| 5,169,386 | 12/1992 | Becker et al. | 604/49 |
| 5,248,878 | 9/1993 | Ihara | 219/121.69 |
| 5,275,646 | 1/1994 | Marshall et al. | 106/20 B |
| 5,391,685 | 2/1995 | Hitomi et al. | 528/75 |

FOREIGN PATENT DOCUMENTS 61-86263   5/1986   Japan .
63-212550  9/1988   Japan .

OTHER PUBLICATIONS

English Abstract for JP 6262842, published Sep. 20, 1994.
English Abstract for DE 4312553, published Oct. 20, 1994.
English Abstract for JP 5096028, published Apr. 20, 1993.
English Abstract for JP 4296588, published Oct. 20, 1992.
English Abstract for JP 4122675, published Apr. 23, 1992.
English Abstract for JP 88044558, published Sep. 6, 1988.
English Abstract for JP 63089377, publ. Apr. 20, 1988 & JP 94084098, publ. Oct. 26, 1994.
English Abstract for JP 62034582, publ. Feb. 14, 1987.
English Abstract for JP 58183285, publ. Oct. 26, 1983 & JP 89032792, publ. Jul. 10, 1989.
English Abstract for JP 58087096, publ. May 24, 1983.
Stowe, F.S. and Lieberman, R.A., "Effect Of Selected UV Bulbs And Photocatalysts On Multifunctional Acrylate Monomer/Homopolymer Properties" (1985).
Sinka, J.V. and LieBerman, R.A. "New Developments In Second Generation Radiation Curable Products For Printed Circuit Boards And Fiber Optics" *Radiation Curing*, (Nov. 1983).
Stowe, F.S. "Specialty Reactive Monomers For RC Coatings", (first 8 pp.), reprinted from *Modern Paint and Coatings,* (Jun. 1982).
Stowe, F.S. "Specialty Reactive Monomers For RC Coatings", (3pp.), reprinted from *Modern Paint and Coatings,* (Aug. 1982).
L–526–163–A, QureTech Material Safety Data Sheet (Jan. 12, 1995).
L–526–163–B, QureTech Material Safety Data Sheet (Jan. 12, 1995).
L–526–163–C, QureTech Material Safety Data Sheet (Jan. 11, 1995).
Trans Tech America, Inc., UV Curable Pad Printing Ink, Material Safety Data Sheet, (Nov. 3, 1993).

*Primary Examiner*—Joseé G. Dees
*Assistant Examiner*—Michael A. Williamson

[57] ABSTRACT

Disclosed herein is a game ball, such as a golf ball, having an indicia formed from a UV curable ink. An ink composition and a method for applying an indicia to a game ball also are disclosed. The UV curable ink has excellent pad transfer properties and durability.

19 Claims, 1 Drawing Sheet

UV CURABLE INK FOR GAME BALL AND METHOD OF PRINTING

BACKGROUND OF THE INVENTION

The present invention generally relates to inks, and more particularly to UV curable inks.

UV curable inks are quick-curing inks and therefore are advantageous for use in continuous-type processes in which subsequent treatment of an ink-printed substrate is involved. A number of UV curable inks are known. For example, U.S. Pat. No. 4,271,258 discloses a photopolymerizable ink composition containing acrylate resin, methacrylate monomer or oligomer, acrylate monomer or oligomer, photoinitiator, and a particular type of an epoxy resin. U.S. Pat. No. 5,391,685 discloses a UV curable ink having an isocyanate compound added thereto. U.S. Pat. No. 5,391,685 contends that the ink disclosed therein is particularly well suited for printing on slightly adhesive plastic bases, such as those made of polyoxymethylenes and polypropylenes.

Screen printing on spherical surfaces such as golf balls can be difficult. As a result, pad printing customarily is used for marking golf ball surfaces. However, many of the known UV curable inks are not well suited for pad printing due to difficulties in transferring the ink from a pad to a substrate. Furthermore, UV curable inks that can be pad printed have not been found suitable for use on golf balls. More specifically, when applied to a golf ball, these inks are not sufficiently durable (impact resistant)to withstand multiple blows by a golf club. It would be useful to obtain a highly durable UV curable ink which has favorable pad transfer properties when used for printing indicia on surfaces such as a curved and dimpled surface of a golf ball, and which provides an image having good durability.

SUMMARY OF THE INVENTION

An object of the invention is to provide a new and improved UV curable ink.

Another object of the invention is to provide a UV curable ink which is particularly well suited for application by pad transfer.

A further object of the invention is to provide a quick curing ink for use on a game ball, such as golf ball, thereby enabling more rapid production.

Another object of the invention is to provide a pad printable, UV curable ink having good impact resistance.

Yet another object of the invention is to provide a game ball, such as a golf ball, having a clear and durable ink image printed thereon.

A further object of the invention is to provide a method for printing an indicia on a game ball, the indicia comprising a UV curable ink.

Yet another object of the invention is to provide a method for applying a smudge resistant and durable indicia to a visible surface of a game ball.

Other objects of the invention will be in part obvious and in part pointed out more in detail hereafter.

The invention in a preferred form is a game ball with a surface and an indicia comprising a UV curable ink adhered to the surface. The impact resistance of the ink and the adhesion between the indicia and the surface are sufficient to render the ball suitable for use in competitive play.

The indicia can be applied directly to the cover of a 1-piece, or two-piece or multi-piece game ball. Alternatively, one or more primer coats can be positioned between the game ball cover and indicia. Furthermore, one or more top coats are positioned over the indicia. The indicia is sufficiently durable that after the game ball is subjected to the wet barrel durability test procedure, at least about 50%, preferably at least about 70%, and more preferably at least about 80% of the surface area of the original image remains on the game ball.

Another preferred form of the invention is a UV curable ink. The ink comprises a UV curable resin, a coloring agent, such as a pigment or dye, and a photoinitiator for initiating polymerization of the UV curable resin. The ink has a sward hardness (ASTM D 2134-66) of no more than about 40 after curing is complete and has adhesive properties and impact resistance sufficient to render it suitable for use on a game ball to be used in competitive play. A thinning agent which includes a monomer and/or solvent also is preferably included. A wetting agent and/or extender pigment also can be added. To facilitate pad transfer, the ink has a viscosity of 1,000–28,000 centipoise, preferably 4,000–28,000 centipoise, and more preferably 6,000–28,000 centipoise at the time of application.

Yet another preferred form of the invention is a method of applying an indicia to a game ball. The method comprises the steps of (a) obtaining a UV curable ink containing a coloring agent, such as a pigment or dye, a photoinitiator, and a UV-curable resin, the ink having a viscosity of 1,000–28,000 and preferably 4,000–27,000 centipoise, (b) applying the ink to the game ball in the form of the indicia, (c) curing the ink to form a cured film having a sward hardness (ASTM D 2134-66) of no more than about 40, and (d) applying a coating over the ink. The indicia has an impact resistance sufficient to render the game ball suitable for use in competitive play. The ink preferably is applied by pad printing. The step of UV curing preferably includes placing the indicia under a UV lamp at conditions of lamp intensity, lamp distance and time sufficient to commence curing of the ink. Curing preferably is substantially complete within about 1 second.

The invention accordingly comprises the several steps and the relation of one or more of such steps with respect to each of the others and the article possessing the features, properties, and the relation of elements exemplified in the following detailed disclosure.

BRIEF DESCRIPTION OF THE DRAWING

The Figure shows a game ball having an indicia comprising a UV curable ink in accordance with the present invention.

DETAILED DESCRIPTION OF THE INVENTION

Figure 1:
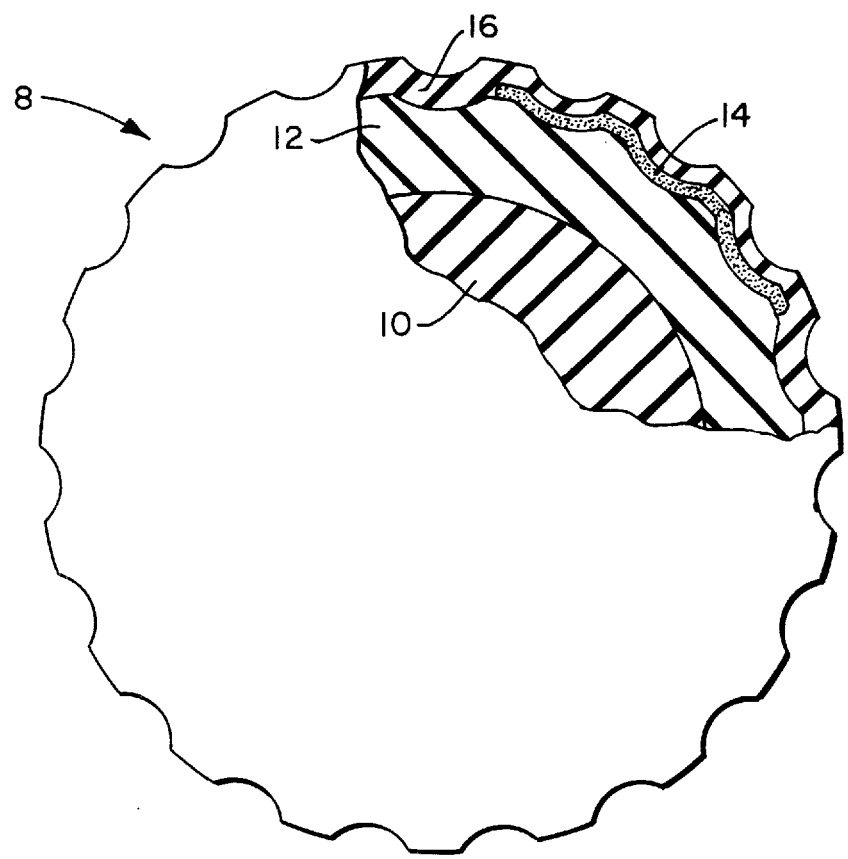

The UV curable ink of the present invention is unique in that it exhibits a combination of favorable transfer properties and good durability or impact resistance. The ink can be used for printing indicia on golf balls, softballs, baseballs and other game balls, particularly on ionomeric resins. The ink also can be used on polybutadiene, synthetic leathers based on polyurethane or polyvinyl chloride, and other game ball cover materials.

As indicated above, the ink comprises a UV curable resin, a coloring agent, such as a pigment or dye, and a photoinitiator. A thinning agent which includes a monomer and/or a solvent can be added. If necessary, a wetting agent also can be included.

The UV curable resin preferably comprises an oligomer. Nonlimiting examples of the oligomer include one or more epoxies, acrylics, acrylated urethanes, elastomeric acrylates, unsaturated polyesters, and polyethers. Specific examples of suitable oligomers include methacrylates such as bisphenol A ethoxylate dimethacrylate and acrylated epoxies. Blends of different oligomers can be used. The oligomer must provide the ink with characteristics of flexibility and impact resistance that are sufficient to withstand the conditions to which the substrate is to be subjected. For example, if the substrate is a golf ball, the oligomer must impart to the ink more flexibility than is inherent in the underlying substrate. When a top coat is to be placed over the ink, the ink should not be so highly cross-linked that adhesion of the top coat to the ink is substantially hindered.

The ink preferably comprises about 10–90 wt % oligomer, more preferably about 20–80 wt % oligomer, and most preferably about 50–70 wt % oligomer.

The coloring agent can be any type of pigment, dye or the like which will withstand UV treatment, i.e., which is not UV labile. Furthermore, the coloring agent should permit sufficient passage of UV light through the ink, by any combination of transmission, reflection, or refraction mechanisms, to initiate photocrosslinking. Liquids or powders can be used. One preferred form of the ink is a powder which is dispersed in liquid monomer. Carbon black and iron oxide black are non-limiting examples of suitable pigments for making black inks. Blends of different pigments and/or dyes can be used. The ink preferably contains about 2–60 wt % pigment, more preferably about 5–30 wt % pigment, and most preferably about 5–10 wt % pigment.

The photoinitiator is selected to respond to the wavelength of UV radiation to be used for photoinitiation. It is also important to consider the color of the ink in selecting the photoinitiator because, as indicated above, it is necessary for the UV light to penetrate in the ink composition to initiate the cure. More specifically, penetration is required in order to cure the portion of the ink which is beneath the surface. Penetration typically is most difficult when black or white pigments are used. Non-limiting examples of photoinitiators to be used in conjunction with black pigment include sulfur-type photoinitiators such as isopropyl thioxanthone, and benzophenone and its derivatives including acetophenone types and thioxanthones. Photoactivators can be used in conjunction with one or more photoinitiators. Non-limiting examples of suitable photoactivators are amine-type photoactivators such as ethyl 4-dimethylamino benzoate. The ink preferably contains about 0.3–5 wt % photoinitiator, more preferably about 1–4 wt % photoinitiator, and most preferably about 3–4 wt % photoinitiator. Blends of different photoinitiators, or photoinitiators and photoactivators, can be used.

A thinning agent is added if it is needed to lower the viscosity of the uncured ink composition or to contribute to impact resistance or flexibility. When monomer is used as a thinning agent, it should be a photopolymerizable monomer which forms a polymeric structure upon irradiation. In contrast, when solvents are used as thinning agents, they evaporate during curing. The monomer can be a monofunctional, difunctional or multifunctional acrylate. Non-limiting examples of suitable monomers include 1,6 hexane dioldiacrylate, butane dioldiacrylate, trimethylol propane diacrylate, tripropylene glycol diacrylate and tetraethylene glycol diacrylate.

The ink preferably contains about 10–70 wt % monomer, more preferably about 10–60 wt % monomer, and most preferably about 10–55 wt % monomer. Preferably, the combination of monomer plus oligomer constitutes about 45–80 wt % of the ink, more preferably about 50–80 wt %, and most preferably about 60–80 wt % of the ink.

When a solvent is used, it typically is a liquid with a fast to moderate evaporation rate which, upon partial evaporation causes the ink to be tacky, and thereby promotes transfer onto and off an ink pad. Solvent also can be the medium in which photoinitiator is dissolved. Non limiting examples of suitable solvents include aromatic solvents such as toluene, xylene, ester types such as butyl acetate. The ink preferably includes about 1–30 wt % solvent, more preferably about 5–20 wt % solvent, and most preferably about 8–10 wt % solvent.

Wetting agents can be added if necessary to prevent beading of the ink upon application to the golf ball. Suitable wetting agents include, but are not limited to, silicon surfactants and fluorocarbon surfactants. The ink preferably includes about 0–2 wt % wetting agent. Other additives that do not adversely affect the pad transfer and impact resistance of the ink also can be incorporated into the ink composition.

Extender pigments such as talc, barium sulfate and the like can be added as long as sufficient durability is maintained. Such materials may be used to improve transferability. Typically, if such materials are used, they constitute about 10–40 wt %, or more preferably 20–30 wt %, of the ink formulation.

The surface tension of the ink affects pad transfer. The surface tension of the ink should not be substantially higher than the surface tension of the substrate upon which it is printed. The viscosity of the ink will determine the thickness of the indicia on the cover. If the indicia is too thick, the UV radiation will not penetrate the indicia and complete curing may become difficult. On the other hand, if the indicia is too thin, the durability of the ink layer may be insufficient for conditions of play. The indicia has a thickness of less than 100 microns, preferably about 10–40 microns, more preferably 13–30 microns, and most preferably 20–25 microns.

The cured ink should be sufficiently flexible that it exhibits good impact resistance. It is advantageous for the top coat which is applied over the ink to react with the ink to hold the ink in place, or to have adhesion by hydrogen bonding and/or Van Der Waals forces. As a non-limiting example, the ink can be used in conjunction with a two component polyurethane top coat, such as a top coat based on polyester or acrylic polyols and aliphatic isocyanates such as hexamethylene diisocyanate or isophorane diisocyanate trimers.

It is essential for a top coat to be applied over the indicia to protect the indicia unless the indicia has sufficient adhesion to the surface to which it is applied. e.g., the cover or a primer layer, to render the use of a top coat unnecessary. The adhesion between the ink and the top coat and/or substrate should be sufficiently strong that the indicia remains substantially intact when the game ball is used. Standards for image retention vary depending upon the intended use of the game ball and the degree and frequency of impact that the image is required to withstand. When applied to a golf ball, the ink durability should be sufficient in order that after the ball is subjected to the wet barrel durability test procedure described below, at least 50% of the surface area of the original image remains, more preferably at least 70%, and most preferably at least 80%.

A formulation of UV curable ink of the invention which is for golf ball printing is prepared and used in the following way. The photoinitiator is dissolved in the thinning agent, which is then mixed with oligomer and pigment. The mixture is placed in an open or closed cup dispenser of a pad printing device. A primed but unfinished golf ball such as that shown in the FIG., which is designated as 8, is obtained. The ball 8 includes, for example, a core 10, and a durable cover layer 12 having a dimpled surface. Alternatively, the core and cover can be formed in one piece. An indicia 14 is pad printed over the golf ball cover 12. The ink indicia can either be stamped directly on the cover or can be stamped on a primer which is placed over the cover. The unfinished golf ball 8 is then subjected to UV treatment under conditions sufficient to commence curing of the ink. After photoinitiation, curing of the ink is substantially complete within a time period of between less than one second and a few seconds.

A top coat layer 16 is placed over the ink indicia after the ink is cured. The top coat layer 16 assists in keeping the indicia on the golf ball surface, as indicated above, and therefore the adhesion of indicia to the golf ball does not need to be as strong as would be required if the ink were to constitute the outer layer of the ball. The top coat typically has a thickness of 10–40 microns.

The conditions of UV exposure which are appropriate to cure the ink can be ascertained by one having ordinary skill in the art. For example, it has been found that when a golf ball passes through a UV treatment apparatus at a rate of 10 ft/min. at a distance of about 1¼–1 ¾ inches from a UV light source which has an intensity of e.g. 200–300 watts/in$^2$, the indicia should be exposed to UV radiation for no more than a few seconds, preferably, no more than about 1 second, and more preferably no more than about 0.7 seconds. Higher and lower UV lamp intensities may be used as long as the cured ink meets the applicable durability requirements. Excess UV exposure is avoided in order to prevent degradation of the substrate. The ink is UV cured prior to application of any top coat.

The pad to be used for transfer of the UV ink preferably contains silicone. This type of pad has good elasticity, durability and softness and an appropriate surface tension. Other types of pads also can be used.

The ink can be applied on a non-UV-labile surface of a game ball. According to the invention, it is generally not necessary to pretreat the surface prior to application of the ink. If it is desired to apply the UV curable ink on an extremely smooth surface upon which transfer is poor, the portion of the surface to be stamped can be chemically or physically etched or abraded in order to provide an ink-receptive surface.

The ink of the invention has a sward hardness after curing of no more than 40, more preferably no more than 20, and most preferably no more than about 14. The UV curable ink of the invention provides for durability sufficient to meet stringent durability standards required for commercial grade golf balls. The durability of the ink can be determined by testing stamped golf balls in a variety of ways, including using the wet barrel durability test procedure.

The wet barrel durability test is performed by first soaking (immersing) the test golf balls in water for at least 3 hours. Thereafter each ball is fired 100 times at a velocity of 134 ft/sec at 72° F. into a five-sided container, the walls of which are steel plates that have had grooves milled therein to simulate the grooves present on a golf club face. The balls are then examined for adhesion of the ink.

Having generally described the invention, the following examples are included for purposes of illustration so that the invention may be more readily understood and are in no way intended to limit the scope of the invention unless otherwise specifically indicated.

EXAMPLE 1

A golf ball printing ink was prepared which contains:

5 parts by weight 1,6 hexane dioldiacrylate (sold by Sartomer, Exton, Pa. 19341), 17.5 parts by weight black pigment paste in diacrylate monomer, sold as Carbon Black UV Dispersion 99B415 (Penn Color, Doylestown, Pa.), 35 parts by weight of an aliphatic urethane acrylate oligomer (CN965, sold by Sartomer, Exton, Pa. 19341).

0.5 parts by weight isopropyl thioxanthone, $C_{16}H_{14}OS$, a sulfur-type photoinitiator (ITX, distributed by Aceto Chemical, Lake Success, N.Y.), 1 part by weight ethyl 4-dimethylamino benzoate, $C_{11}H_{15}NO_2$, an amine-type photoactivator (EDB, distributed by Aceto Chemical, Lake Success, N.Y.), 4.4 parts by weight xylene solvent, and 4.4 parts by butyl acetate solvent.

The photoinitiator and photoactivator were dissolved in the xylene/butyl acetate solvent blend. The ink was pad printed using a silicone pad on unprimed, dimpled ionomeric covers of several dozen golf balls. The ink had a viscosity of about 27,500 (centipoise) cps at the time of application. The balls containing the stamped indicia were passed through a Uvex UV treatment apparatus Lab Model #14201 at a rate of 10 feet/min, using a lamp intensity of 235 watt/in$^2$ and wavelength range of 200–400 nm with the indicia being located about 1¾ inches from the UV light source. The ink was cured in less than about 1 second and had a sward hardness of about 14 after curing was complete. The golf balls were then coated with a solvent borne polyurethane top coat formed from a polyester type hexamethylene diisocyanate. The adhesion of the indicia on the balls was tested for durability according to the wet barrel durability test procedure described above. After wet barrel durability testing, the balls were examined and it was found that no more than about 20% of the surface area of the original ink logo was removed.

EXAMPLE 2

The procedure of Example 1 was repeated with the exception that the ink formulation that was used contained:

10 parts by weight 1,6 hexane dioldiacrylate (sold by Sartomer), 35 parts by weight black pigment paste in diacrylate monomer, sold as Carbon Black UV Dispersion 99B415, 70 parts by weight of a difunctional aliphatic urethane acrylate oligomer (Ebecryl 4833 RadCure, Smyrna, Ga.), 1 part by weight isopropyl thioxanthone, $C_{16}H_{14}OS$ (ITX), and 2 parts by weight ethyl 4-dimethylamino benzoate (EDB).

The ink had a viscosity of about 25,000 cps. The ink was cured in about 1 second and produced a film having a sward hardness of about 12. The balls were subjected to the wet barrel durability test procedure. After the wet barrel durability testing, it was found that no more than about 20% of the ink logo was removed.

EXAMPLE 3

The procedure of Example 1 was repeated with the exception that the CN965 oligomer was replaced by a difunctional oligomer sold as Ebecryl 8402 (Rad-Cure, Smyrna, Ga.). The ink had a viscosity of about 18,000 cps. The ink was cured in about 1 second and produced a film having a sward hardness of about 14. The ink was found to be as nearly as durable as that of Examples 1 and 2.

EXAMPLE 4

The procedure of Example 1 was repeated with the exception that the ink formulation that was used contained:

- 7.3 parts by weight 1,6 hexane dioldiacrylate (sold by Sartomer, Exton, Pa. 19341),
- 19.2 parts by weight black pigment paste in diacrylate monomer, sold as ICU 366 BLK (Industrial Color Ink, Joliette, Ill.),
- 21.0 parts by weight aliphatic polyether urethane oligomer (BR571, Bomar Specialties Company, Winsted, Conn.),
- 0.5 parts by weight isopropyl thioxanthone, $C_{16}H_{14}OS$, a sulfur-type photoinitiator (ITX, distributed by Aceto Chemical, Lake Success, N.Y.),
- 1 part by weight ethyl 4-dimethylamino benzoate (EDB),
- 11.4 parts by weight talc (Vantalc 6H, Vanderbilt, Norwalk, Conn.),
- 22.9 parts by weight barium sulfate (106 Low-Micron White Barytles, Whittaker, Clark & Daniels, Inc., South Plainfield, N.J.),
- 12.1 parts by weigh butyl acetate solvent, and
- 4.6 parts by weight propylene glycol monomethyl ether acetate solvent.

The ink was applied directly to ionomeric covers of golf balls, and also over ionomeric covers to which a water borne polyurethane primer layer had been applied prior to application of the ink. The ink was cured in about 1 second and produced a film having a sward hardness of about 14. The balls were top coated and subjected to the wet barrel durability test procedure. After the wet durability testing, it was found that no more than about 20% of the ink logo was removed.

COMPARATIVE EXAMPLE 1

The procedure of Example 1 was repeated with the exception that a commercially available UV curable ink was used, namely Blk #700801 (Trans Tech, Carol Stream, Ill.). The ink had a viscosity of about 6,000 cps. The ink was cured in about 1 second and produced a film having a sward hardness of about 26. After the wet barrel durability test only the outline of the logo remained. Most of the ink in the dimples and on the land areas had been removed. Intercoat adhesion between the ink and top coat was poor.

COMPARATIVE EXAMPLE 2

The procedure of Example 1 was repeated on several golf balls with the exception that a commercially available UV curable ink was used, namely L-526-163-B (Qure Tech, Seabrook, N.H.). The ink had a viscosity of about 28,500 cps. The ink was cured in about 1 second and produced a film having a sward hardness of about 20. As a result of the wet barrel durability test, the ink on at least about 60% of the surface area of the logo had been removed. It is believed that the ink was too brittle to withstand the conditions of the wet barrel durability test.

As will be apparent to persons skilled in the art, various modifications and adaptations of the structure above described will become readily apparent without departure from the spirit and scope of the invention, the scope of which is defined in the appended claims.

What is claimed is:

1. A game ball having a surface and an indicia comprising a UV curable ink adhered to the surface, the UV curable ink being formed from a composition comprising a UV curable resin and a photoinitiator, the impact resistance of the ink UV cured and the adhesion between the indicia and the surface after UV curing being sufficient to render the ball suitable for use in competitive play.

2. A game ball according to claim 1, wherein the game ball is a golf ball.

3. A game ball according to claim 1, wherein the UV curable ink is a pad transferable ink.

4. A game ball according to claim 1, wherein the surface to which the indicia is adhered comprises a top coat.

5. A game ball according to claim 3, wherein the top coat is formed over the indicia.

6. A game ball according to claim 2, wherein after being subjected to the wet barrel durability test procedure, the ink on at least about 50% of the surface area of the indicia has been retained.

7. A game ball according to claim 2, wherein after being subjected to a wet barrel durability test procedure, the ink on at least about 70% of the surface area of the indicia has been retained.

8. A game ball according to claim 1, wherein after being subjected to a wet barrel durability test procedure, the ink on at least about 80% of the surface area of the indicia has been retained.

9. A game ball according to claim 2, wherein after being subjected to a wet barrel durability test procedure, the ink on at least about 80% of the surface area of the indicia has been retained.

10. A game ball according to claim 1, wherein the UV curable ink has a viscosity of 6,000–28,000 centipoise.

11. A game ball according to claim 1, wherein the UV curable ink has a viscosity of 18,000 to 28,000 centipoise.

12. A game ball according to claim 1, wherein the photoinitiator is at least one member selected from the group consisting of sulfur-type photoinitiators, benzophenone, and derivatives of benzophenone.

13. A game ball according to claim 1, wherein the UV curable ink further comprises a photoactivator.

14. A game ball according to claim 13, wherein the photoactivator is an amine type photoactivator.

15. A game ball according to claim 14, wherein the ink composition has a viscosity in the range of 6,000–28,000 centipoise.

16. A game ball according to claim 14, wherein the UV curable resin comprises 10–90 wt % oligomer.

17. A game ball according to claim 14, when the ink contains 2–60 wt % coloring agent and 1–4 wt % photoinitiator.

18. A game ball according to claim 13, when the ink contains sufficient quantities of photoinitiator and photoactivator to permit the ink to cure within a few seconds upon exposure to UV light.

19. A game ball having a surface and an indicia adhered to the surface, the indicia being formed from a UV curable ink composition, comprising:

a UV curable resin, a coloring agent, and a photoinitiator for initiating polymerization of the UV curable resin, the ink having a viscosity of about 1,000–28,000 centipoise and a Sward hardness (ASTM D 2134-66) of no more than about 40 after curing, the adhesive properties and impact resistance of the ink after UV curing rendering the ink suitable for use on a cover of a game ball to used in competitive play.

* * * * *